US012678805B2

(12) United States Patent
Creswick

(10) Patent No.: US 12,678,805 B2
(45) Date of Patent: Jul. 14, 2026

(54) LIQUID TREATMENT UNIT AND METHOD

(71) Applicant: AU ENVIRONMENTAL PTY LTD, Picton (AU)

(72) Inventor: Glen David Creswick, New South Wales (AU)

(73) Assignee: AU ENVIRONMENTAL PTY LTD, Picton (AU)

( * ) Notice: Subject to any disclaimer, the term of this patent is extended or adjusted under 35 U.S.C. 154(b) by 1014 days.

(21) Appl. No.: 17/279,282

(22) PCT Filed: Sep. 27, 2019

(86) PCT No.: PCT/AU2019/051050
§ 371 (c)(1),
(2) Date: Mar. 24, 2021

(87) PCT Pub. No.: WO2020/061644
PCT Pub. Date: Apr. 2, 2020

(65) Prior Publication Data
US 2021/0402419 A1      Dec. 30, 2021

(30) Foreign Application Priority Data
Sep. 27, 2018    (AU) ................................ 2018903655

(51) Int. Cl.
*B04C 9/00*          (2006.01)
*B04C 5/04*          (2006.01)
(Continued)

(52) U.S. Cl.
CPC .................. *B04C 9/00* (2013.01); *B04C 5/04* (2013.01); *B04C 5/103* (2013.01); *B04C 5/13* (2013.01);
(Continued)

(58) Field of Classification Search
CPC .......................... C02F 41/463; B04C 5/103–13
See application file for complete search history.

(56) References Cited

U.S. PATENT DOCUMENTS 3,525,437 A    8/1970  Kaeding et al.
4,650,577 A    3/1987  Hansel
(Continued)

FOREIGN PATENT DOCUMENTS

AU        200035378 A1    11/2000
AU        200220298 B2     7/2003
(Continued)

OTHER PUBLICATIONS

International Search Report dated Dec. 16, 2019 from corresponding International Patent Application No. PCT/AU2019/051050, 5 pages.
(Continued)

*Primary Examiner* — Luan V Van
*Assistant Examiner* — Andrew Koltonow
(74) *Attorney, Agent, or Firm* — Ruggiero McAllister & McMahon LLC

(57)            ABSTRACT

A liquid treatment unit removes particulate matter and colloids from a liquid, as found in waste water on mines, on construction sites and on heavy industry sites. The liquid treatment unit includes an electrocoagulation unit and a cyclonic separator unit. The liquid to be treated is first subject to electrocoagulation and then fed into the cyclonic separator unit. The cyclonic separator unit guides the electrocoagulated liquid in a circular path downwardly from an outer perimeter to move underneath a skirt and then upwardly and inwardly towards a central outlet located at the top of the cyclonic separator. Floating particles are skimmed from the surface outside of the skirt. In moving to the outlet, the liquid passes through a plurality of nested
(Continued)

frusto-conical guide members. An ultrasonic transducer is used to collapse bubbles formed by electrocoagulation, and to clean the electrocoagulation electrodes.

10 Claims, 11 Drawing Sheets

(51) Int. Cl.

| | |
|---|---|
| B04C 5/103 | (2006.01) |
| B04C 5/13 | (2006.01) |
| C02F 1/36 | (2023.01) |
| C02F 1/38 | (2023.01) |
| C02F 1/40 | (2023.01) |
| C02F 1/461 | (2023.01) |
| C02F 1/463 | (2023.01) |
| C02F 103/00 | (2006.01) |
| C02F 103/10 | (2006.01) |

(52) U.S. Cl.
CPC ............... *C02F 1/36* (2013.01); *C02F 1/385* (2013.01); *C02F 1/40* (2013.01); *C02F 1/46109* (2013.01); *C02F 1/463* (2013.01); *C02F 2001/46119* (2013.01); *C02F 2103/001* (2013.01); *C02F 2103/10* (2013.01)

(56) References Cited

U.S. PATENT DOCUMENTS

| | | | | |
|---|---|---|---|---|
| 4,780,201 A | * | 10/1988 | Keeter ............... | B01D 21/2444 |
| | | | | 210/512.1 |
| 5,407,584 A | | 4/1995 | Broussard, Sr. | |
| 6,358,415 B1 | | 3/2002 | Leung | |
| 2002/0185446 A1 | * | 12/2002 | Johnny ................... | C02F 1/463 |
| | | | | 210/717 |
| 2005/0230321 A1 | | 10/2005 | Berrak et al. | |
| 2009/0145774 A1 | | 6/2009 | Farooq et al. | |
| 2013/0111859 A1 | * | 5/2013 | Bryant ................... | B01D 46/42 |
| | | | | 55/501 |
| 2015/0040526 A1 | * | 2/2015 | Brownlee .............. | B01D 45/16 |
| | | | | 55/418 |
| 2017/0197158 A1 | | 7/2017 | Kompala | |
| 2018/0117510 A1 | * | 5/2018 | Shanov ..................... | B04C 5/04 |

FOREIGN PATENT DOCUMENTS

| | | | | | |
|---|---|---|---|---|---|
| DE | | 1769579 A1 | 10/1971 | | |
| GB | | 2007545 A | * 5/1979 | .............. | B04B 1/08 |
| WO | | 2013/144664 A1 | 10/2013 | | |
| WO | | WO-2013144634 A1 | * 10/2013 | ............... | C02F 9/00 |

OTHER PUBLICATIONS

Written Opinion dated Dec. 16, 2019 from corresponding International Patent Application No. PCT/AU2019/051050, 5 pages.
International Preliminary Report on Patentability dated Oct. 19, 2020 from corresponding International Patent Application No. PCT/AU2019/051050, 22 pages.

* cited by examiner

LIQUID TREATMENT UNIT AND METHOD

CROSS-REFERENCE TO RELATED APPLICATIONS

This application is a national stage application, filed under 35 U.S.C. § 371, of International Patent Application No. PCT/AU2019/051050, filed on Sep. 27, 2019, which claims priority to Australian Patent Application 2018903655, filed on Sep. 27, 2018, the entire contents of each of which is incorporated by reference herein in its entirety.

COPYRIGHT NOTICE

BACKGROUND OF THE DISCLOSURE

1. Field of the Disclosure

The present disclosure relates to a liquid treatment unit, and in particular to a liquid treatment unit for removing particulate matter from contaminated liquid.

The disclosure has been developed primarily for use in removing solid particulate contaminants from dirty liquid such as waste water and/or water run-off found on industrial sites, construction sites or on mines, and will be described hereinafter with reference to this application. However, it will be appreciated that the disclosure is not limited to this particular field of use.

2. Description of Related Art

At present, liquids such as water or liquid mixtures are used for a wide variety of tasks that may be found on, for example industrial sites, construction sites and/or mines. Liquid run-off is a problem, as the liquid may have been contaminated by materials found on such sites. Ideally, such run-off liquid is collected and reused. However, the presence of particulate matter in the run-off liquid, especially in a colloidal form, can make it unusable. In addition, in a mining context, the particulates in the run-off liquid could contain valuable minerals, and it would be desirable to remove these for processing.

One method that is used currently to remove colloidal or particular matter from run-off liquid includes the provision of settling dams, in which the particulate matter is allowed to settle. However, this process may be slow, and some colloidal or particulate matter may remain in suspension indefinitely. In order to speed up settling of the particulate matter, chemical such as flocculants and/or coagulants are used to clump particulate material together, increasing its mass and causing it to settle to the bottom.

The present disclosure seeks to provide a liquid treatment unit, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

According to a first aspect, the present disclosure may be said to consist in a liquid treatment unit for at least partially removing particles from a flow of liquid. The liquid treatment unit may comprise an electrocoagulation unit. The electrocoagulation unit may comprise a housing. The housing may include a housing inlet and a housing outlet through which the flow of liquid is movable in use in a liquid flow path. The electrocoagulation unit may comprise a plurality of parallel plates housed within the housing in the liquid flow path. Preferably the parallel plates are configured to be electrically charged. The liquid treatment unit may comprise a cyclonic separator unit. The cyclonic separator unit may comprise a cylindrical container. The cylindrical container may include a separator inlet for a flow of liquid and a separator outlet. The separator outlet may be located proximate the central axis of the cylindrical container. The cyclonic separator unit may be configured for causing the flow of liquid to move from the inlet in a substantially circular path before moving to the outlet.

According to a further aspect, the present disclosure may be said to consist in a liquid treatment unit for at least partially removing particles from a flow of liquid, the liquid treatment unit comprising:

a. an electrocoagulation unit, the electrocoagulation unit comprising i. a housing including a housing inlet and a housing outlet through which the flow of liquid is movable in use in a liquid flow path;

ii. a plurality of electrodes housed within the housing in the liquid flow path, the electrodes being configured to be electrically charged; and b. a cyclonic separator unit, the cyclonic separator unit comprising i. a cylindrical container, the cylindrical container including a separator inlet for a flow of liquid and a separator outlet located proximate the central axis of the cylindrical container;

ii. wherein the cyclonic separator unit is configured for causing the flow of liquid to move from the separator inlet in a substantially circular path before moving to the separator outlet.

In one embodiment, the electrodes are parallel plates.

In one embodiment, the liquid treatment unit includes at least one ultrasonic transducer configured to stream ultrasound waves into the flow of liquid in the electrocoagulation unit.

In one embodiment, at least one ultrasonic transducer configured to stream ultrasound waves to impinge on the plates.

In one embodiment, the ultrasonic transducer is configured to generate ultrasound waves in the flow of liquid at a frequency of between 15 kHz and 1000 kHz.

In one embodiment, the ultrasonic transducer is configured to generate ultrasound waves in the flow of liquid at a frequency of between 100 kHz and 150 kHz.

In one embodiment, the housing outlet is configured for discharging the flow of liquid into the cyclonic separator unit in a direction parallel to the tangent of the cylindrical container, to thereby facilitate the flow of liquid to move in a substantially circular path.

In one embodiment, the cyclonic separator unit includes a guide for guiding the flow of liquid within the cylindrical container.

In one embodiment, the guide includes a cylindrical skirt.

In one embodiment, the guide includes an upper cover wall.

In one embodiment, the upper cover wall includes a cover wall central aperture.

In one embodiment, the guide includes a tubular central column.

In one embodiment, the guide includes a hollow central column.

In one embodiment, the guide includes a plurality of substantially frusto-conical guide members that are connected to each other at regularly spaced intervals to define a flow path between adjacent frusto-conical guide members.

In one embodiment, the tubular central column is perforated.

In one embodiment, the tubular central column is concentric with the cylindrical skirt.

In one embodiment, the guide includes at least one or more substantially frusto-conical guide members that extends in a substantially frusto-conical configuration.

In one embodiment, the frusto-conical guide members each define a tapered wall extending upwards and inwardly.

In one embodiment, the cyclonic separator unit includes a guide including a cylindrical skirt for guiding the flow of liquid within the cylindrical container.

In one embodiment, the frusto-conical guide members are consistent in thickness along the tapered wall.

In one embodiment, the guide includes a plurality of frusto-conical guide members.

In one embodiment, the frusto-conical guide members are substantially coaxial with the cylindrical skirt.

In one embodiment, the frusto-conical guide members define a series of troughs and channels extending radially outwardly.

In one embodiment, the series of troughs and channels extend spirally along the tapered wall.

In one embodiment, the frusto-conical guide members are located inwardly of the cylindrical skirt.

In one embodiment, the guide defines a flow path between an inner surface of the cylindrical skirt and the frusto-conical guide members.

In one embodiment, the frusto-conical guide members are located outwardly of the tubular central column.

In one embodiment, the frusto-conical guide members are connected to an outer surface of the tubular central column.

In one embodiment, the frusto-conical guide members are connected to each other at spaced intervals.

In one embodiment, the frusto-conical guide members define a consistent distance between the tapered walls.

In one embodiment, the frusto-conical guide members each define a central flow path.

In one embodiment, the frusto-conical guide members each include a central aperture that together define a central flow path for receiving the central column.

In one embodiment, the liquid treatment unit includes a surface drainage outlet located at or towards the top of the cylindrical container, the drainage outlet being configured for removal of floating contaminants from the liquid surface in use.

In one embodiment, the liquid treatment unit includes a liquid treatment housing for housing the electrocoagulation unit and cyclonic separator unit.

According to a further aspect, the present disclosure may be said to consist in a liquid treatment unit for at least partially removing particles from a flow of liquid, the liquid treatment unit comprising:

a. a cyclonic separator unit, the cyclonic separator unit including:

i. a cylindrical container, the cylindrical container including a separator inlet for a flow of liquid and a separator outlet located proximate the central axis of the cylindrical container, ii. wherein the cyclonic separator unit is configured for causing the flow of liquid to move from the separator inlet in a substantially circular path before moving to the separator outlet; and b. a guide located at least partly within the cylindrical container, the guide being configured for guiding the flow of liquid from the separator inlet separator outlet via a flow path, the guide including:

i. a substantially cylindrical skirt, whereby the cylindrical skirt is configured to guide the flow of liquid from the separator inlet outwardly of the cylindrical skirt and downwardly, before moving inwardly of the cylindrical skirt towards the separator outlet.

In one embodiment, the cylindrical skirt is configured to guide the flow of liquid from the separator inlet outwardly of the cylindrical skirt and downwardly, before moving inwardly of the cylindrical skirt towards the separator outlet.

In one embodiment, the guide includes an upper cover wall.

In one embodiment, the upper cover wall includes a cover wall central aperture.

In one embodiment, the guide includes a hollow central column.

In one embodiment, the hollow central column is perforated.

In one embodiment, the guide includes a tubular central column.

In one embodiment, the tubular central column is perforated.

In one embodiment, the tubular central column is concentric with the cylindrical skirt.

In one embodiment, the guide includes at least one or more substantially frusto-conical guide members that extends in a substantially frusto-conical configuration.

In one embodiment, the frusto-conical guide members each define a tapered wall extending upwards and inwardly.

In one embodiment, the frusto-conical guide members are consistent in thickness along the tapered wall.

In one embodiment, the frusto-conical guide members are nested with each other.

In one embodiment, the frusto-conical guide members are nested with each other while retaining a consistent distance between each other.

In one embodiment, the guide includes a plurality of frusto-conical guide members.

In one embodiment, the frusto-conical guide members are substantially coaxial with the cylindrical skirt.

In one embodiment, the frusto-conical guide members define a series of troughs and channels extending radially outwardly.

In one embodiment, the series of troughs and channels extend spirally along the tapered wall.

In one embodiment, the frusto-conical guide members are located inwardly of the cylindrical skirt.

In one embodiment, the guide defines a flow path between an inner surface of the cylindrical skirt and the frusto-conical guide members.

In one embodiment, the frusto-conical guide members are located outwardly of the tubular central column.

In one embodiment, the frusto-conical guide members are connected to an outer surface of the tubular central column.

In one embodiment, the frusto-conical guide members are connected to each other at spaced intervals.

In one embodiment, the frusto-conical guide members define a consistent distance between the tapered walls.

In one embodiment, the frusto-conical guide members each define a central flow path.

In one embodiment, the frusto-conical guide members each define a central aperture through which the central column is receivable.

In one embodiment, the liquid treatment unit includes a surface drainage outlet located at or towards the top of the cylindrical container, the drainage outlet being configured for removal of floating contaminants from the liquid surface in use.

In one embodiment, the liquid treatment unit comprises an electrocoagulation unit, the electrocoagulation unit comprising:

a. a housing including a housing inlet and a housing outlet through which the flow of liquid is movable in use in a liquid flow path;

b. a plurality of parallel plates housed within the housing in the liquid flow path, the parallel plates being configured to be electrically charged; and In one embodiment, the liquid treatment unit includes at least one ultrasonic transducer configured to stream ultrasound waves into the flow of liquid in the electrocoagulation unit.

In one embodiment, the ultrasonic transducer is configured to generate ultrasound waves in the flow of liquid at a frequency of between 15 kHz and 1000 kHz.

In one embodiment, the ultrasonic transducer is configured to generate ultrasound waves in the flow of liquid at a frequency of between 100 kHz and 150 kHz.

In one embodiment, the housing outlet is configured for discharging the flow of liquid into the cyclonic separator unit in a direction parallel to the tangent of the cylindrical, to thereby facilitate the flow of liquid to move in a substantially circular path.

According to a further aspect, the present disclosure may be said to consist in a liquid treatment unit for at least partially removing particles from a flow of liquid, the liquid treatment unit comprising:

a. a cyclonic separator unit, the cyclonic separator unit including:

i. a cylindrical container, the cylindrical container including a separator inlet for a flow of liquid and a separator outlet located proximate the central axis of the cylindrical container, ii. wherein the cyclonic separator unit is configured for causing the flow of liquid to move from the separator inlet in a substantially circular path before moving to the separator outlet; and b. a guide located at least partly within the cylindrical container, the guide being configured for guiding the flow of liquid from the separator inlet separator outlet via a flow path, the guide including:

i. a plurality of substantially frusto-conical guide members that extends in a substantially frusto-conical configuration;

ii. wherein the frusto-conical guide members define a series of troughs and ridges extending radially outwardly.

In one embodiment, the guide includes a substantially cylindrical skirt, whereby the cylindrical skirt is configured to guide the flow of liquid from the separator inlet outwardly of the cylindrical skirt and downwardly, before moving inwardly of the cylindrical skirt towards the separator outlet.

In one embodiment, the guide includes an upper cover wall.

In one embodiment, the upper cover wall includes a cover wall central aperture.

In one embodiment, the guide includes a perforated hollow central column.

In one embodiment, the guide includes a tubular central column.

In one embodiment, the tubular central column is perforated.

In one embodiment, the tubular central column is co-centric with the cylindrical skirt.

In one embodiment, the frusto-conical guide members each define a tapered wall extending upwards and inwardly.

In one embodiment, the frusto-conical guide members are consistent in thickness along the tapered wall.

In one embodiment, the frusto-conical guide members are nested with each other.

In one embodiment, the frusto-conical guide members are nested with each other while retaining a consistent distance between each other.

In one embodiment, the frusto-conical guide members are substantially coaxial with the cylindrical skirt.

In one embodiment, the series of troughs and channels of the frusto-conical guide members extend spirally along the tapered wall.

In one embodiment, the frusto-conical guide members are located inwardly of the cylindrical skirt.

In one embodiment, the guide defines a flow path between an inner surface of the cylindrical skirt and the frusto-conical guide members.

In one embodiment, the frusto-conical guide members are located outwardly of the tubular central column.

In one embodiment, the frusto-conical guide members are connected to an outer surface of the tubular central column.

In one embodiment, the frusto-conical guide members are connected to each other at spaced intervals.

In one embodiment, the frusto-conical guide members define a consistent distance between the tapered walls.

In one embodiment, the frusto-conical guide members each define a central flow path.

In one embodiment, the liquid treatment unit includes a surface drainage outlet located at or towards the top of the cylindrical container, the drainage outlet being configured for removal of floating contaminants from the liquid surface in use.

In one embodiment, the liquid treatment unit comprises an electrocoagulation unit, the electrocoagulation unit comprising:

a. a housing including a housing inlet and a housing outlet through which the flow of liquid is movable in use in a liquid flow path;

b. a plurality of parallel plates housed within the housing in the liquid flow path, the parallel plates being configured to be electrically charged; and In one embodiment, the liquid treatment unit includes at least one ultrasonic transducer configured to stream ultrasound waves into the flow of liquid in the electrocoagulation unit.

In one embodiment, the ultrasonic transducer is configured to generate ultrasound waves in the flow of liquid at a frequency of between 15 kHz and 1000 kHz.

In one embodiment, the ultrasonic transducer is configured to generate ultrasound waves in the flow of liquid at a frequency of between 100 kHz and 150 kHz.

In one embodiment, the housing outlet is configured for discharging the flow of liquid into the cyclonic separator unit in a direction parallel to the tangent of the cylindrical, to thereby facilitate the flow of liquid to move in a substantially circular path.

In one embodiment, the cylindrical skirt is configured to guide the flow of liquid from the separator inlet outwardly of the cylindrical skirt and downwardly, before moving inwardly of the cylindrical skirt towards the separator outlet.

According to a further aspect, the present disclosure may be said to consist in a method of treating a flow of liquid by removing particles from the flow of liquid, the method comprising the steps of:

a. passing a flow of liquid between a plurality of electro-coagulation plates to charge the particles in the liquid to clump together; and b. guiding the flow of liquid to move in a substantially circular direction as a circular flow to cause heavier particles in the liquid to move outwardly.

In one embodiment, the method includes the step of directing ultrasound waves through the flow of liquid as it passes between the electrocoagulation plates.

In one embodiment, the step of guiding the flow of liquid to move in a substantially circular direction comprises the steps of:

a. guiding the flow of liquid to move downwardly in a substantially circular direction in a circular flow to separate particles from the flow of liquid as a partly separated flow of liquid; and b. subsequently guiding the separated flow of liquid to move centrally of the substantially circular flow, and out an outlet.

In one embodiment, the step of guiding the partly separated flow of liquid to move centrally of the substantially circular flow comprises the step of guiding the separated flow of liquid between a plurality of regularly spaced nested frusto-conical guide members to cause further separation of the partly separated flow of liquid.

According to a further aspect, the present disclosure may be said to consist in a liquid treatment unit for at least partially removing particles from a flow of liquid, the liquid treatment unit comprising:

a. an electrocoagulation unit, the electrocoagulation unit comprising i. a housing including a housing inlet and a housing outlet through which the flow of liquid is movable in use in a liquid flow path;

ii. a plurality of electrodes housed within the housing in the liquid flow path, the electrodes being configured to be electrically charged; and b. a cyclonic separator unit, the cyclonic separator unit comprising i. a cylindrical container, the cylindrical container including a separator inlet for receiving a flow of liquid from the electrocoagulation unit, and a separator outlet located proximate at or towards the top of the cylindrical container, and proximate the central axis of the cylindrical container;

ii. wherein the cyclonic separator unit is configured for causing the flow of liquid to move from the separator inlet in a substantially circular path and downwardly before moving upwards and inwardly to the separator outlet.

According to a further aspect, the present disclosure may be said to consist in a liquid treatment unit for at least partially removing particles from a flow of liquid, the liquid treatment unit comprising:

a. a cyclonic separator unit, the cyclonic separator unit including:

i. a cylindrical container, the cylindrical container including a separator inlet located towards at or towards the top of the cylindrical container, and configured for introducing the flow of liquid in use into the cylindrical container in direction parallel to a tangent to the container and a separator outlet located proximate the central axis of the cylindrical container, ii. wherein the cyclonic separator unit is configured for causing the flow of liquid to move from the separator inlet in a substantially circular path before moving to the separator outlet; and b. a guide located at least partly within the cylindrical container, the guide being configured for guiding the flow of liquid from the separator inlet to the separator outlet via a flow path, the guide including:

i. a substantially cylindrical skirt, whereby the cylindrical skirt is configured to guide the flow of liquid from the separator inlet outwardly of the cylindrical skirt and downwardly, before moving inwardly of the cylindrical skirt and upwardly towards the separator outlet.

According to a further aspect, the present disclosure may be said to consist in a liquid treatment unit for at least partially removing particles from a flow of liquid, the liquid treatment unit comprising:

a. a cyclonic separator unit, the cyclonic separator unit including:

i. a cylindrical container, the cylindrical container including a separator inlet for a flow of liquid and a separator outlet located proximate the central axis of the cylindrical container, ii. wherein the cyclonic separator unit is configured for causing the flow of liquid to move from the separator inlet in a substantially circular path before moving to the separator outlet; and b. a guide located at least partly within the cylindrical container, the guide being configured for guiding the flow of liquid from the separator inlet to the separator outlet via a flow path, the guide including:

i. a plurality of substantially frusto-conical guide members that are nested with each other at regular spaced distances to define a flow path between each adjacent nested frusto-conical guide member;

ii. wherein the frusto-conical guide members define a series of troughs and channels extending radially outwardly.

According to a further aspect, the present disclosure may be said to consist in a method of treating a flow of liquid by removing particles from the flow of liquid, the method comprising the steps of:

a. passing a flow of liquid between a plurality of electro-coagulation plates to charge the particles in the liquid to clump together; and b. guiding the flow of liquid to move downwardly in a substantially circular direction in a circular flow to separate particles from the flow of liquid as a partly separated flow of liquid; and c. subsequently guiding the separated flow of liquid to move upwardly and centrally of the substantially circular flow, and out an outlet.

This disclosure may also be said broadly to consist in the parts, elements and features referred to or indicated in the specification of the application, individually or collectively, and any or all combinations of any two or more of said parts, elements or features, and where specific integers are mentioned herein which have known equivalents in the art to which this disclosure relates, such known equivalents are deemed to be incorporated herein as if individually set forth.

To those skilled in the art to which the disclosure relates, many changes in construction and widely differing embodiments and applications of the disclosure will suggest themselves without departing from the scope of the disclosure as defined in the appended claims. The disclosures and the descriptions herein are purely illustrative and are not intended to be in any sense limiting.

Other aspects of the disclosure are also disclosed.

BRIEF DESCRIPTION OF THE DRAWINGS

Notwithstanding any other forms which may fall within the scope of the present disclosure, preferred embodiments of the disclosure will now be described, by way of example only, with reference to the accompanying drawings in which:

Figure 7:
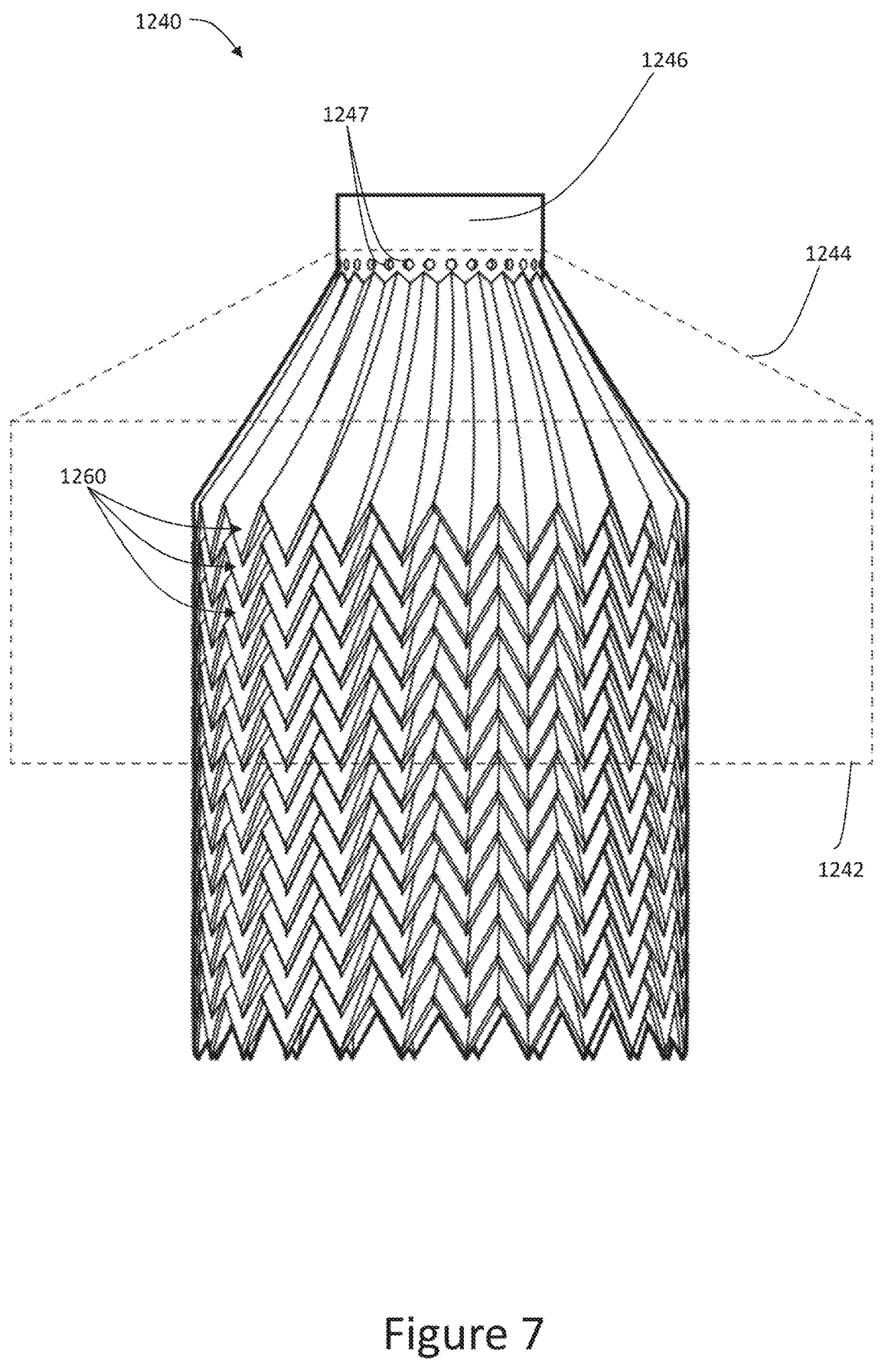

FIG. 7 shows a side view of guide of the liquid treatment unit of FIG. 5;

DETAILED DESCRIPTION OF THE DISCLOSURE

Figure 1:
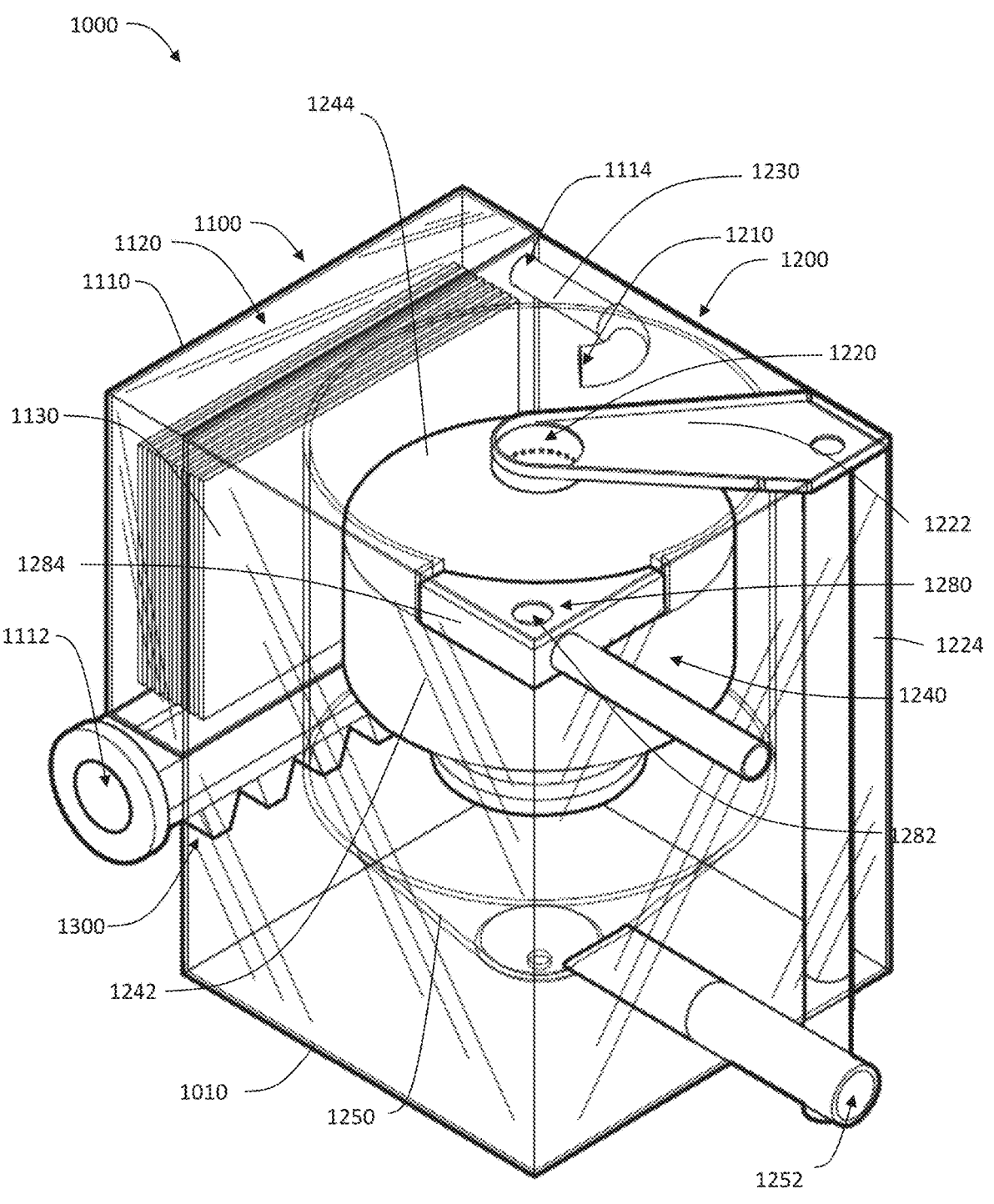
FIG. 1 shows a top right front part wireframe perspective view of a first embodiment of a liquid treatment unit.
Figure 2:
FIG. 2 shows a cutaway rear elevation view of the liquid treatment unit of FIG. 1.
Figure 2:
Figure 3:
FIG. 3 shows a side view of guide of the liquid treatment unit of FIG. 1.

It should be noted in the following description that like or the same reference numerals in different embodiments denote the same or similar features.

In a first aspect, a liquid treatment unit according to a first aspect of the disclosure is generally indicated by the numeral 1000.

In one embodiment now described, there is provided a liquid treatment unit 1000 for at least partially removing contaminants such as dissolved metals, colloidal particles and/or other particles (not shown) from a flow of liquid (not shown). The liquid treatment unit 1000 includes a frame or liquid treatment housing 1010. The liquid treatment housing 1010 houses an electrocoagulation unit 1100 and a cyclonic separator unit 1200.

The electrocoagulation unit 1100 preferably includes its own housing 1110 that includes a housing inlet 1112 and a housing outlet 1114 for the flow of liquid to enter into, and flow out of an internal chamber 1120 in the housing 1110.

A plurality of electrodes in the form of parallel plates 1130 are located within the internal chamber 1120. The parallel plates 1130 are connectable to an electrical power supply (not shown) to thereby electrically charge the parallel plates 1130 to generate an electrical field between them. It is envisaged that the electrical power supply could come from a local power source such as a battery (not shown), solar or wind, or the electrical power supply could be a mains power supply. In a preferred embodiment, it is envisaged that the power will be provided in the form of a reversing DC current. The current may be provided from a battery, or a transformer that transforms AC current to DC current.

The liquid treatment unit 1000 further includes an ultrasonic transducer 1300 that is located below the electrocoagulation unit 1100. The ultrasonic transducer 1300 is configured for generating ultrasound waves in the flow of liquid as it passes through the electrocoagulation unit 100. Preferably, the ultrasonic transducer is configured to generate ultrasound waves in the flow of liquid at a frequency of between 15 kHz and 1000 kHz, and more preferably at between about 100 kHz and 150 kHz. It is envisaged that the ultrasonic transducer could be located above, below or to the sides of the electrocoagulation unit 1100.

The presence of bubbles generated from the electrical fields of the electrocoagulation unit 1100 is not desirable as it serves to prevent the settling out of heavier coagulated particles. The ultrasonic transducer 1300 is used to collapse bubbles generated by the electrical field of the electrocoagulation unit 1100, as well as to help clean off buildup of scale or dirt on the plates 1130.

The cyclonic separator unit 1200 includes a cylindrical container 1230. The lower end of the cylindrical container 1230 terminates in an inverted cone formation 1250, the cylindrical container 1230 and inverted cone formation together providing a separation tank. At the bottom of the inverted cone formation 1250 is a sludge outlet 1252 for removal of particulate matter that has settled at the bottom of the inverted cone formation 1250.

The cyclonic separator unit 1200 also includes a separator inlet 1210 for receiving a flow of liquid from the electrocoagulation unit 1100, and a separator outlet 1220 through which clarified liquid that has been separated from the particulate matter flows. The separator outlet 1220 is located centrally, proximate to the central axis of the cylindrical container 1230. The separator outlet 1220 includes a drainage bridge 1222 for guiding clarified fluid flow out of the outlet and outwardly of the cylindrical container 1230, where it falls into drainage pipe 1224.

The separator inlet 1210 is configured for guiding a flow of liquid into the cylindrical container 1230, where the flow of liquid is aligned in a direction parallel to the tangent of the cylindrical container 1230. In this way, water received into the cylindrical container 1230 causes a circular flow path of liquid in the cylindrical container before moving to the separator outlet 1220.

The cyclonic separator unit 1200 also includes a guide 1240 for guiding the flow of liquid within the cylindrical container 1230. The guide 1240 extends from the top of the cylindrical container 1230 most of the way down its length, but does not extend all the way down to the inverted cone formation 1250.

The guide 1240 includes a cylindrical skirt 1242 that is concentric with the cylindrical container 1230. The cylindrical skirt 1242 extends from the top of the cylindrical container 1230 at least partly down the length of the cylindrical container, but does not extend all the way to the bottom, thereby allowing flow of liquid from the separator inlet 1210, underneath the lower edge of the cylindrical skirt 1242, and upwardly towards the separator outlet 1220.

An upper end of the cylindrical skirt 1242 is closed by an upper cover wall 1244. The cylindrical skirt 1244 divides the volume of the cylindrical container to define an outer flow path 1232 for the flow of liquid, in which the liquid flows in a circular direction around the outside of the cylindrical skirt 1242, and downwardly to the bottom edge of the cylindrical skirt, and an inner flow path 1234 in which the flow of liquid moves inwardly and upwardly towards the separator outlet 1220 in use. The cylindrical skirt 1242 and upper cover wall 1244 prevent the flow of liquid from entering into the cylindrical container 1230 at the separator inlet 1210, and moving directly towards the separator outlet 1220. In this way, the flow path of the flow of liquid within the cylindrical container 1230 is lengthened.

The guide 1240 further includes a hollow tubular central column 1246 that is concentric with the cylindrical skirt 1242. The tubular central column 1246 is preferably perforated with apertures 1247 to allow for the flow of liquid through it. The tubular central column 1246 is preferably cylindrical in shape, although alternative shapes are envisaged. The tubular central column 1246 extends centrally of the cylindrical container 1230 from the top of the cylindrical container 1230 to a length most of the way down the length of the cylindrical container 1230.

Outwardly of the tubular central column 1246, and preferably connected thereto, are a plurality of nested frusto-conical guide members 1260, 1270. The frusto conical guide members 1260, 1270 are located inwardly of the cylindrical skirt 1242, but outwardly of the tubular central column 1246. Each of the frusto conical guide members 1260, 1270 include a tapered wall 1262, 1272 that is generally frusto conical in shape and/or configuration, and which is concentric with the cylindrical skirt 1242 and/or tubular central column 1246.

Each of the frusto conical guide members 1260, 1270 are spaced at regular intervals from each other down the length of the tubular central column 1246. The tapered walls 1262, 1272 are preferably consistent in thickness, so that the frusto conical guide members 1260, 1270 define a consistent distance between the tapered walls 1262, 1272.

Each of the individual frusto conical guide members 1260 includes a central aperture 1264, 1274 through which the tubular central column 1246 is received, and which acts as a flow path for the flow of liquid. The frusto conical guide members 1260, 1270 are preferably connected to an outer surface of the tubular central column 1246.

It will be appreciated by those skilled in the art that the frusto conical guide members 1260, 1270 need not be attached to a tubular central column, but could instead be connected to each other by elongate strips or the like that would still allow the flow of fluid between the tapered walls 1262, 1272 of the adjacent frusto conical guide members 1260, 1270 and through the central apertures 1264, 1274 to the separator outlet 1220.

Figure 4:
FIG. 4 shows a top perspective view of a view of frusto conical guide member of the guide of the liquid treatment unit of FIG. 1.
Figure 5:
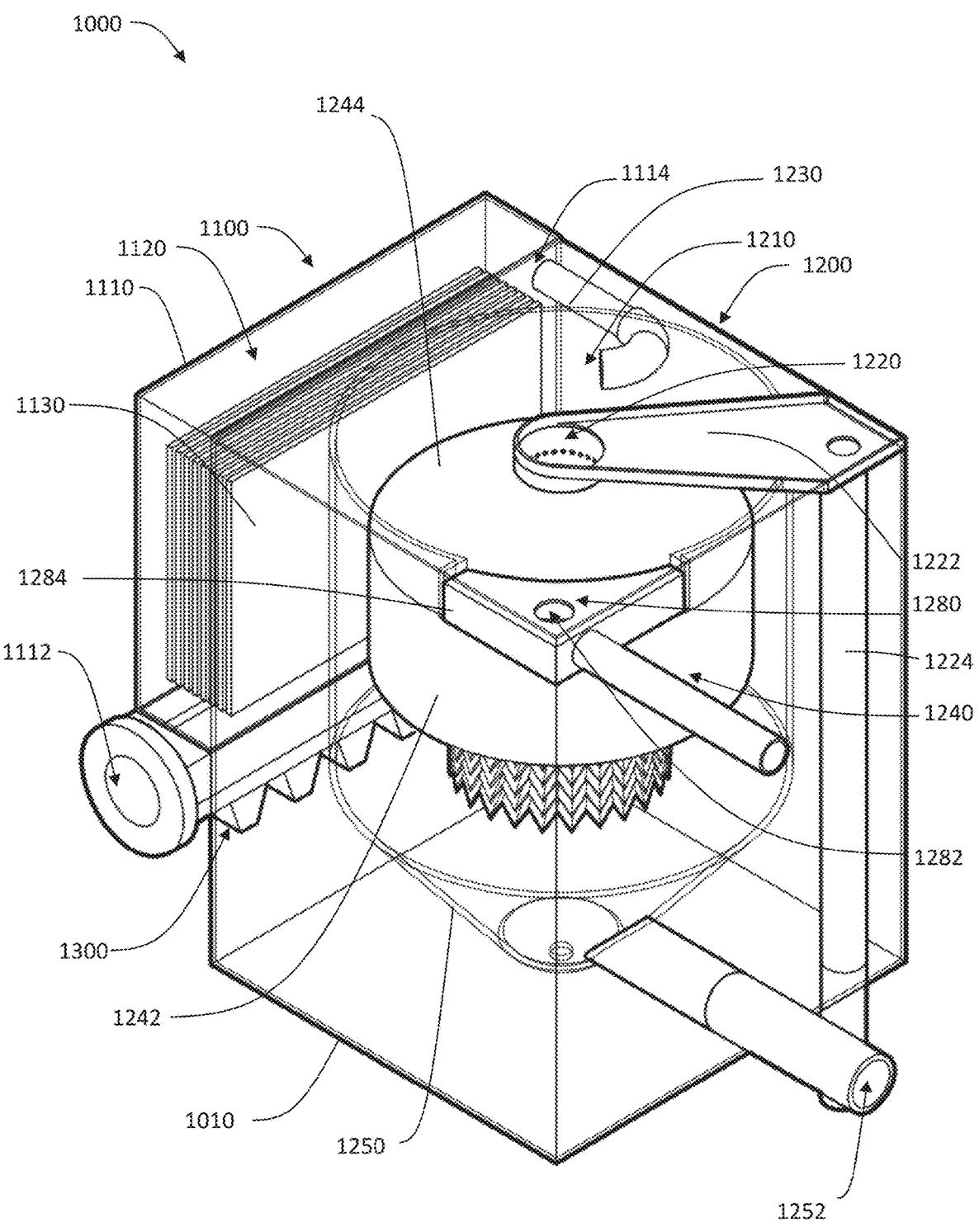
FIG. 5 shows a top right front part wireframe perspective view of a second embodiment of a liquid treatment unit.
Figure 6:
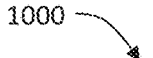
FIG. 6 shows a cutaway rear elevation view of the liquid treatment unit of FIG. 5.
Figure 8:
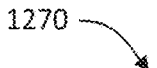
FIG. 8 shows a top perspective view of a frusto conical guide member of the guide of the liquid treatment unit of FIG. 5.
Figure 8:
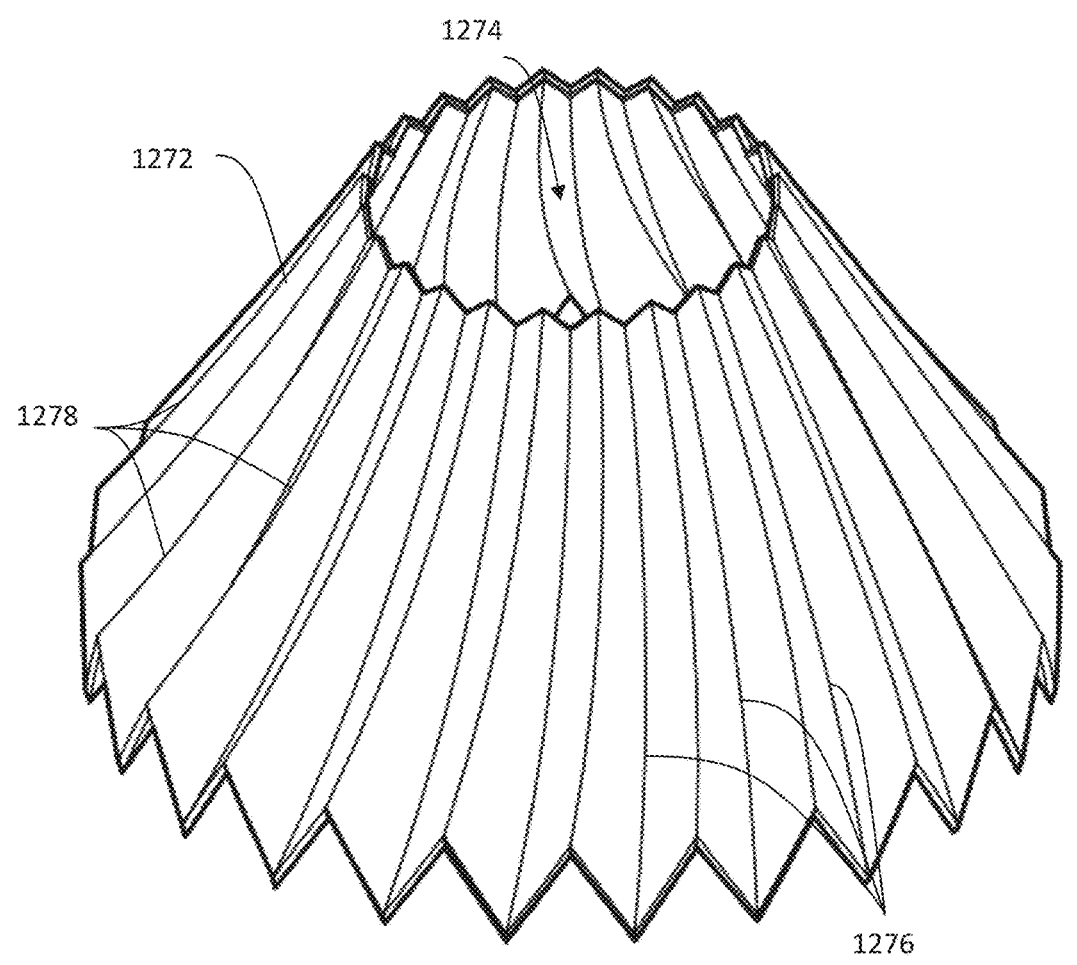

In the embodiment shown in FIGS. 1-4 and 10, the frusto conical guide members 1260 are configured with a smooth tapered wall 1262. An example of an individual frusto conical guide member is shown in FIG. 4. In this embodiment, the tapered angle of the tapered walls 1262 will preferably be between 50° and 70° to the horizontal, and most preferably at about 60°.

Figure 9:
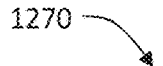
FIG. 9 shows a top view of a frusto conical guide member of FIG. 8.
Figure 9:
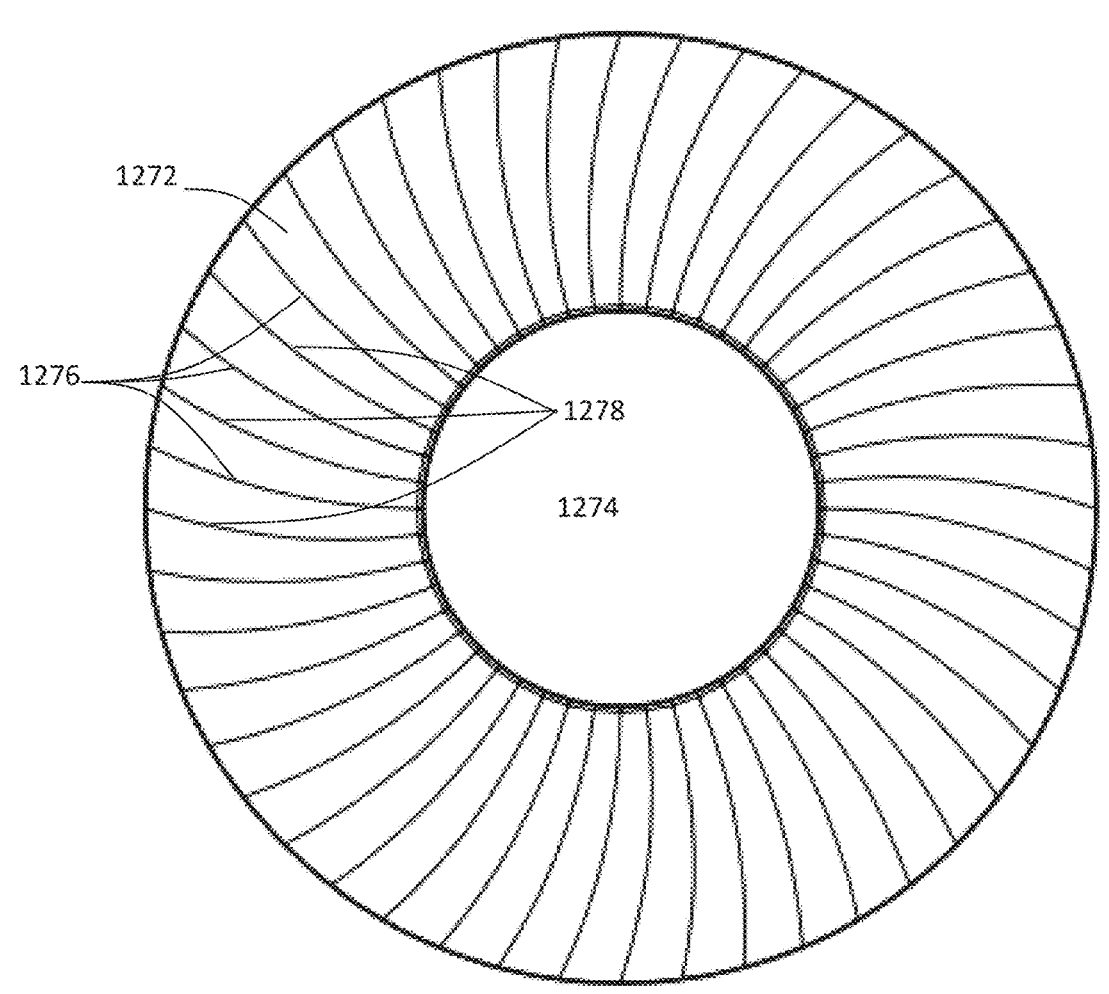
Figure 10:
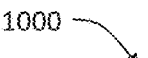
FIG. 10 shows a close-up view of FIG. 2, showing the guide.
Figure 11:
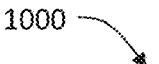
FIG. 11 shows a close-up view of FIG. 6, showing the guide.

In the embodiment shown in FIGS. 5-9 and 11, the frusto conical guide members 1270 are configured with a tapered wall 1272 that defines a series of troughs 1276 and ridges 1278. Each of the troughs 1276 and ridges 1278 extend radially outwardly from the central aperture 1274 in a spiral formation, as shown in FIG. 9. In this embodiment, it is envisaged that the troughs 1276 will extend at an angle of 60° to the horizontal, while the ridges 1278 will extend at an angle of 50° to the horizontal.

The frusto conical guide members 1260, 1270 do not extend to the cylindrical skirt 1242, allowing liquid to flow between an inner surface of the cylindrical skirt 1242 and the outer periphery of the frusto conical guide members 1260, 1270, and into the gaps (shown as arrow G in FIG. 2) between the frusto conical guide members 1260, 1270. It has been found that an angle of between 50° and 70°, and most preferably about 60°, to the horizontal is optimal for preventing the settling of particulate matter on the frusto conical guide members 1260, causing it to slide downwardly as clamped particular matter, and thereby preventing blocking of the gaps G.

The liquid treatment unit 1000 further includes a surface skimming arrangement 1280 located at a towards the top of the cylindrical container 1230. The surface skimming arrangement 1280 includes a surface drainage box 1284 that includes a surface drainage outlet 1282 that is configured to be just below the surface of the fluid in use, allowing floating contaminants or floating matter (not shown) to fall into the surface drainage outlet 1282, thereby skimming the floating matter from the surface of the fluid in use. The surface skimming arrangement is used for removing particles or detritus that have a lighter density than water, or which may have been carried to the surface by bubbles generated in the electrocoagulation unit. Such particles are removed preferably immediately after entering the cylindrical container 1230 via the inlet. It is envisaged that a rotating arm surface skimmer (not shown) could be provided to facilitate the skimming of the water surface.

In another aspect, there is now described a method of treating of a flow of liquid by removing particles from the flow of liquid using the liquid treatment unit 1000 described above. Firstly, liquid containing particular matter will be guided through the housing inlet 1112 of the electrocoagulation unit 1100, and passed between the parallel plates 1130, while the parallel plates 1130 are charged by an electrical power source. This will cause the individual particles in the fluid flow to be charged negatively and/or positively. The charges of the particles will cause them to clump together, making heavier combined particles. However, it is anticipated that the use of an electrical charge may generate bubble in the flow of liquid.

The fluid flow between the parallel plate 1130 also has ultrasound waves directed through it from the ultrasonic transducers 1300. The ultrasound waves have the effect of keeping the parallel plates 1130 clean, as well as the effect of collapsing bubbles generated in the liquid by the charged parallel plates 1130.

The flow of liquid is then guided to the cyclonic separator unit 1200 where it is deposited into the top of the cylindrical container 1230 in a direction parallel to the tangent of the cylindrical container, and between an inner surface of the cylindrical container and an outer surface of the cylindrical skirt 1242. The flow of liquid then flows in a circular path around the outside of the cylindrical skirt 1242, and downwardly. The circular path generates centripetal forces in the fluid flow, causing heavier particles in the fluid flow to move radially outwardly towards the inner surface of the cylindrical container 1230. These heavier particles then sink downwardly into the inverted cone formation 1250, where they are drained from the sludge outlet 1252. The most clarified fluid flow then travels upwardly through the tubular central column 1246 to the separator outlet 1220. Less clarified fluid flow moves upwardly between an inner surface of the cylindrical skirt 1242 and the outer periphery of the frusto conical guide members 1260, 1270 before flowing into the gap G between the tapered walls 1262, 1272 of the frusto conical guide members 1260, 1270. As the fluid flow moves between the tapered walls 1262, 1272, the fluid flow most proximate the tapered walls will be slowed by contact with the tapered walls, and will cause the further settling out of particulate matter in the fluid flow. Particles in the fluid flow will settle onto the frusto conical guide members 1260, 1270, and slide downwardly, falling off the frusto conical guide members and being collected in the inverted cone formation 1250 for removal via the sludge outlet 1252.

Clarified fluid will flow upwardly through the separator outlet 1220, over the outlet bridge 1222, and down drainage pipe 1224.

The guide 1240 provides a number of advantages. These include:

a. it assists in preventing turbulence within the cylindrical container 1230, b. it forces heavier particles down to the bottom of the separation tank, c. it prevents liquid moving directly between the separator inlet and the separator outlet, d. it establishes a longer flow path for liquid between the separator inlet and the separator outlet, and e. it creates high and low velocity zones to assist in the separation of particulate matter from the flow of fluid.

The ultrasonic transducer 1300 has the effect of creating ultrasonic cavitation which helps keeps the surfaces of the electrodes in the form of parallel plates clean, and assisting with the mixing, agitation and destabilisation of pollutants.

The electrocoagulation also provides several distinct electrochemical results, especially when applied to a flow of water. These include:

a. seeding resulting from the anode reduction of metal irons that become new centres for larger, stable insoluble complexes that precipitate as complex metal oxides, b. Emulsion breaking resulting from the oxygen and hydrogen ions that bond into the water receptor sites of oil molecules creating a water insoluble complex separating water from oil, driller's mud, dyes, inks, etc., c. Halogen complexing as the metal ions bind themselves to chlorines in a chlorinated hydrocarbon molecule resulting in a large insoluble complex separating water from pesticides, herbicides, chlorinated PCB's etc., d. Electron flooding of the water eliminates the polar effect of the water complex, allowing colloidal materials to precipitate, and the increase of electrons creates an osmotic pressure that ruptures bacteria, cysts, and viruses, e. Oxidation—Reduction reactions are forced to their natural end within the chamber, which speeds up the natural process of oxidation breakdown f. pH increases of pH due to the formation of hydroxyl ions or the consumption of hydronium ions/protons g. increased settlement of heavy particles in the cyclonic separator unit, h. Flotation of light particles to move to surface skimming arrangement Using a liquid treatment unit described above, Applicant believes that a water can be clarified to a relatively good extent while using relatively small amounts of energy input.

In addition, where features or aspects of the disclosure are described in terms of Markush groups, those skilled in the art will recognise that the disclosure is also thereby described in terms of any individual member or subgroup of members of the Markush group.

For the purpose of this specification, where method steps are described in sequence, the sequence does not necessarily mean that the steps are to be carried out in chronological order in that sequence, unless there is no other logical manner of interpreting the sequence.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

In describing the preferred embodiment of the disclosure illustrated in the drawings, specific terminology will be resorted to for the sake of clarity. However, the disclosure is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

For the purposes of this specification, the term "plastic" shall be construed to mean a general term for a wide range of synthetic or semisynthetic polymerization products, and generally consisting of a hydrocarbon-based polymer.

As used herein the term "and/or" means "and" or "or", or both.

As used herein "(s)" following a noun means the plural and/or singular forms of the noun.

In the claims which follow and in the preceding description of the disclosure, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the disclosure.

Any one of the terms: including or which includes or that includes as used herein is also an open term that also means including at least the elements/features that follow the term, but not excluding others. Thus, including is synonymous with and means comprising.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Although the disclosure has been described with reference to specific examples, it will be appreciated by those skilled in the art that the disclosure may be embodied in many other forms.

It is apparent from the above, that the arrangements described are applicable to the water treatment industries.

The invention claimed is:

1. A liquid treatment unit for at least partially removing particles from a flow of a treatment liquid, the liquid treatment unit comprising:

an electrocoagulation unit, the electrocoagulation unit comprising:

a housing including a housing inlet and a housing outlet through which the flow of the treatment liquid is movable in use in a liquid flow path, and a plurality of electrodes housed within the housing in the liquid flow path, the electrodes being configured to be electrically charged;

a cyclonic separator unit, the cyclonic separator unit comprising:

a cylindrical container, the cylindrical container including a separator inlet for receiving the flow of the treatment liquid from the electrocoagulation unit, and a separator outlet located proximate at or towards a top of the cylindrical container, and proximate a central axis of the cylindrical container, a guide located at least partly in the cylindrical container, the guide including a cylindrical skirt extending at least partly down a length of the cylindrical container and defining an outer flow path for the flow of the treatment liquid where the treatment liquid flows in a circular direction around an outside of the cylindrical skirt, and an inner flow path in which the flow of the treatment liquid moves inwardly of the cylindrical skirt and upwardly towards the separator outlet; and a hollow column suspended within the cylindrical skirt and being concentric therewith, the hollow column having:

a plurality of substantially frusto-conical guide members mounted to the hollow column extending outwardly therefrom, wherein the substantially frusto-conical guide members are nested with each other at regular spaced distances to define a filter flow path between each adjacent nested frusto-conical guide member, wherein at least one or more of the plurality of substantially frusto-conical guide members includes a wall that defines a continuous series of troughs and ridges extending radially outwardly, wherein the continuous series of troughs and ridges defines a triangular wave pattern in cross-section, wherein each trough terminates in a valley apex and each ridge terminates in a peak apex, and wherein the filter flow path provided by the hollow column and guide members effectively allows settling out of the particulates suspended in the treatment liquid thereon, to remove particles from the flow of treatment liquid.

2. The liquid treatment unit as claimed in claim 1, wherein the liquid treatment unit includes at least one ultrasonic transducer configured to stream ultrasound waves into the flow of the liquid in the electrocoagulation unit.

3. The liquid treatment unit as claimed in claim 1, wherein the hollow column includes perforations.

4. The liquid treatment unit as claimed in claim 1, wherein the continuous series of troughs and ridges extend spirally along the wall.

5. The liquid treatment unit as claimed in claim 1, wherein the substantially frusto-conical guide members are located inwardly of the cylindrical skirt.

6. The liquid treatment unit as claimed in claim 1, wherein the guide defines a flow path between an inner surface of the cylindrical skirt and the substantially frusto-conical guide members.

7. The liquid treatment unit as claimed in claim 1, wherein each substantially frusto-conical guide member has a central aperture at a first end thereof through which the hollow column extends and an outer periphery at a second end thereof opposite the first end, and wherein the continuous series of troughs and ridges extend across an entirety of the wall from the central aperture to the outer periphery.

8. A liquid treatment unit for at least partially removing particles from a flow of a treatment liquid, the liquid treatment unit comprising:

an electrocoagulation unit, the electrocoagulation unit comprising:

a housing including a housing inlet and a housing outlet through which the flow of the treatment liquid is movable in use in a liquid flow path, and a plurality of electrodes housed within the housing in the liquid flow path, the electrodes being configured to be electrically charged;

a cyclonic separator unit, the cyclonic separator unit comprising:

a cylindrical container, the cylindrical container including a separator inlet for receiving the flow of the treatment liquid from the electrocoagulation unit, and a separator outlet located proximate to or towards a top of the cylindrical container, and proximate a central axis of the cylindrical container, a guide located at least partly within the cylindrical container, the guide including a cylindrical skirt extending at least partly down a length of the cylindrical container and defining an outer flow path for the flow of the treatment liquid where liquid flows in a circular direction around an outside of the cylindrical skirt, and an inner flow path in which the flow of the treatment liquid moves inwardly of the cylindrical skirt and upwardly towards the separator outlet; and a hollow column suspended within the cylindrical skirt and being concentric therewith, the hollow column having:

a plurality of substantially frusto-conical guide members mounted to the hollow column extending outwardly therefrom, wherein the substantially frusto-conical guide members are statically nested with each other at regular spaced distances to define a filter flow path between each adjacent nested frusto-conical guide member, wherein at least one or more of the plurality of substantially frusto-conical guide members includes a wall that defines a continuous series of troughs and ridges extending radially outwardly, wherein the continuous series of troughs and ridges defines a triangular wave pattern in cross-section, wherein each trough terminates in a valley apex and each ridge terminates in a peak apex, wherein the troughs and ridges of the substantially frusto-conical guide members extend spirally along the wall, and wherein the filter flow path provided by the hollow column and guide members effectively allows settling out of the particulates suspended in the treatment liquid thereon, to remove particles from the treatment liquid.

9. The liquid treatment unit as claimed in claim 8, further comprising:

a surface skimming arrangement, wherein the surface skimming arrangement is configured to remove floating contaminants from the surface of the treatment liquid in the cyclonic separator unit.

10. The liquid treatment unit as claimed in claim 8, wherein each substantially frusto-conical guide member has a central aperture at a first end thereof through which the hollow column extends and an outer periphery at a second end thereof opposite the first end, and wherein the continuous series of troughs and ridges extend across an entirety of the wall from the central aperture to the outer periphery.

* * * * *